United States Patent Office 3,842,171
Patented Oct. 15, 1974

3,842,171
METHOD OF COMBATING FILARIASIS IN DOGS
Ernst Albert Hermann Friedheim, 5 Avenue Marc
Monnier, Geneva, Switzerland
No Drawing. Filed Mar. 9, 1973, Ser. No. 339,843
Int. Cl. A61k 27/00
U.S. Cl. 424—245                                    6 Claims

ABSTRACT OF THE DISCLOSURE

Method of combating filariasis due to D. immitis in dogs, comprising administering to a dog a pharmaceutically effective amount of a compound of the formula

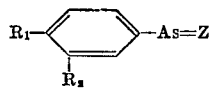

wherein Z is oxygen or a group of the formula $$-S-CH-CH_2OH$$
$$-S-CH_2$$

or Z represents two groups of the formula

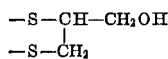

$R_1$ is —OH, —NH·CO·NH$_2$, —CO·NH$_2$, $$-CH_2-CO\cdot NH_2$$

or

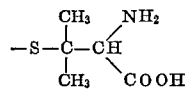

and $R_2$ is hydrogen, —NH$_2$ or —NH·CO·CH$_3$.

---

The present invention is concerned with a method of combating filariasis due to D. immitis in dogs by administrating to a dog certain arsenic compounds as defined hereafter.

The causal treatment of diseases caused by filaria requires according to the present state of science, two drugs, one of which acts upon the adult worms (macrofilaria) and the other on the embryonic forms (microfilaria). For the destruction of the adult worms preparations containing arsenic are available, but they are limited in their use in as far as they have to be applied via the parenteral route. Two currently used compounds, thioacetarsamide and oxychlorophenarsin (Mapharsen) have to be applied strictly intravenously, because they produce inflammatory reactions and necrosis when applied by subcutaneous and intramuscular fashion.

It is an object of this invention to provide an effective drug against filariasis in the dog, which drug can be given orally.

It has now been found that certain phenylarsenoxides and their mercaptides, when given orally, are well tolerated in therapeutic doses by dogs and kill the adult worms of Dirafilaria immitis in the blood of infected dogs.

According to the present invention, the method of combating filariasis due to D. immitis in dogs comprises administering to a dog a pharmaceutically effective amount of a compound of the formula I

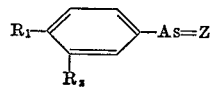

wherein Z is oxygen or a group of the formula $$-S-CH-CH_2OH$$
$$-S-CH_2$$

or Z represents two groups of the formula

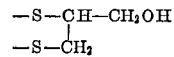

$R_1$ is —OH, —NH·CO·NH$_2$, —CO·NH$_2$, $$-CH_2-CO\cdot NH_2$$

or

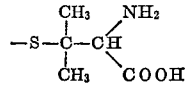

and $R_2$ is hydrogen, —NH$_2$ or —NH·CO·CH$_3$.

The new technical effect achieved by oralmacrofilaricidal therapy consists of the practical advantages of a therapy obviating the use of syringes and injections under aseptic conditions requiring trained personnel.

A further advantage of the present invention is presented by particular galenic forms allowing orally active macrofilaricidal agents to be applied together with orally active microfilaricidal agents such as the compounds known under the names of Diethylcarbamazine (Hetrazan) and Dithiazanine Iodide.

The compounds according to formula I can be applied, as dry powder in bulk, or contained in capsules, tablets, dragées, or dissolved or suspended or emulsified in a pharmaceutically acceptable liquid non-aqueous medium, e.g. propyleneglycol, ethyl-oleate, benzyl alcohol, salicylic alcohol (Saligenine) oils including olive-, sesame-, cottonseed-, peanut oil, and mixtures thereof, if desired with additives affecting advantageously dispersion, emulsion, stability, taste.

For oral application the compounds according to formula I may be mixed into the food of the animals to be treated, in form of dry powder, or in solution, suspension, emulsion as stated in the foregoing paragraph, if desired with a taste improving additive.

Solutions in propyleneglycol are added to the food preferably after dilution with 1–10 volumes of water.

In a preferred form of the present invention the macrofilaricidal compounds according to formula I may be mixed with microfilaricidal agents, f.e. Diethylcarbamazine or Dithiazanine for simultaneous oral application, in dry state or in solution, suspension, emulsion in organic liquids as stated above.

EXAMPLE 1

Dry powder in caps:                                  G.
  Melarsenoxide _____ 0.100
  Dithazanine _____ 0.200 filler, q.e. lactose for one capsule.

EXAMPLE 2

Susp. in oil mixture:
  Melarsaprol (Mel B) _____ g__  2.0
  Diethylcarbamazine _____ g__  4.0
  peanut oil _____ ml__ 76.0
  ethyloleate _____ ml__ 19.0
  Metaphen C in oil 1:1000 _____ ml__  5.0
  Tween 80 _____ ml__  0.1

Mix and micronize at high speed to fine suspension.

EXAMPLE 3

Solution:
  Melarsenoxide _____ g__   2.0
  propyleneglycol _____ ml__ 100.0

By stirring and warming to 80° a clear solution is obtained which may be vialled. For oral application the solution is preferably diluted with 1–10 vol. of water.

In the above examples Melarsenoxide and Melarsoprol can be replaced by other compounds corresponding to formula I and Diethylcarbamazine by other microfilaricidal agents f.e. Dithazanine iodide.

It is understood that the quantities and concentrations of compounds according to formula I when applied as such may vary in wide limits, f.e. between 0.05 and 0.60 g. per unit of dry powder in capsules, tablets, dragées, and the concentrations in solutions and suspensions etc. e.g. between 0.1 and 6.0%.

The proportion of compounds according to formula I and microfilaricidal compounds, e.g. Diethylcarbamazine and Dithazanine Iodide, in mixtures, may range from 1:1 to 1:10 or 1:1 to 10:1.

The dosage for the oral treatment of canine filariasis with compounds of formula I ranges from 2–50 mg./kg. for the single dose. The dosage of Diethylcarbamazine is known to range from 50–100 mg./kg., and the dosage of Dithazanine 5–10 mg./kg. for the single dose in canine filariasis.

Examples for oral macrofilaricidal activity of compounds according to formula I are recorded in table I. It appears that these compounds reduce the number of living adult worms significantly, in certain cases to zero.

These compounds have little direct effect on microfilaria.

The microfilaricidal effect of Diethylcarbamazine and Dithazanine Iodide are known.

The macrofilaricidal oral application of compounds according to formula I, can be associated with parenteral applications of microfilaricidal agents such as Hoe 33 258 and fention (Bayer 29 493, Baytex etc.).

TABLE

[Number of living specimens of *Dirafilaria immitis* found at autopsy of naturally injected dogs, 35 days after oral treatment with a substituted phenylarsenoxide or mercaptides thereof with one dose a day for 5 consecutive days. Dogs were killed at the end of the observation period with intravenous phenobarbital]

| Dog No. | Kg. | Substance | Single dose, mg./kg. | Living filaria, p.m. m | f | Total |
|---|---|---|---|---|---|---|
| 1 | 16.0 | Melarsenoxide | 2 | 5 | 3 | 8 |
| 2 | 22.5 | do | 5 | 2 | 0 | 2 |
| 3 | 13.3 | Mel B | 5 | 11 | 3 | 14 |
| 4 | 18.0 | do | 10 | 3 | 2 | 5 |
| 5 | 16.6 | Mel-pa | 20 | 3 | 1 | 4 |
| 6 | 17.5 | do | 40 | 7 | 0 | 7 |
| 7 | 19.1 | Arsenamid B | 5 | 21 | 17 | 33 |
| 8 | 9.5 | do | 10 | 18 | 2 | 20 |
| 9 | 21.1 | Carbason B | 10 | 14 | 5 | 19 |
| 10 | 23 | do | 20 | 9 | 2 | 11 |
| 11 | 17 | Mapharsen | 2 | 23 | 16 | 39 |
| 12 | 15 | do | 4 | 16 | 5 | 21 |
| 13 | 18 | Mapharsen B | 3 | 33 | 16 | 49 |
| 14 | 19.5 | do | 6 | 4 | 0 | 4 |
| 15 | 20.7 | | | 18 | 13 | 31 |
| 16 | 21.4 | | | 22 | 28 | 40 |
| 17 | 18.9 | | | 10 | 10 | 20 |
| 18 | 22.3 | | | 6 | 7 | 13 |

The various compounds mentioned above have the following formulas:

Melarsenoxide 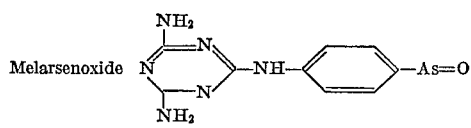

Mel B 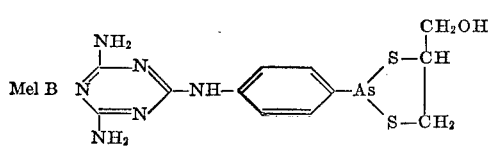

Mel-pa 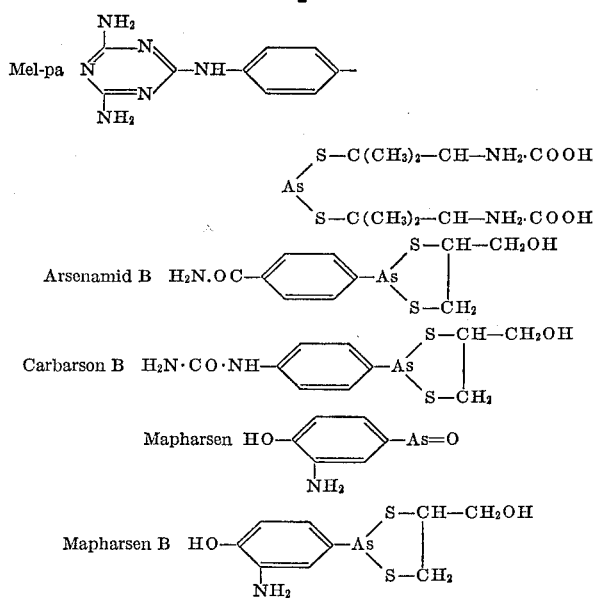

Arsenamid B

Carbarson B

Mapharsen

Mapharsen B

Diethylcarbamazine = 1-diethylcarbamoyl-4-methyl-piperazine

Dithazanine = 3,3′-diethyl-thiadicarboxycyanine (iodide).

What is claimed is:

1. A method of combating filariasis due to *D. immitis* in dogs, comprising orally administering to an infected dog a pharmaceutically effective amount of a compound of the formula I

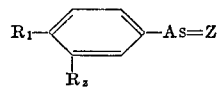

wherein Z is oxygen or a group of the formula $$-S-CH-CH_2OH$$
$$-S-CH_2$$

or Z represents two groups of the formula

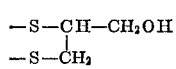

$R_1$ is

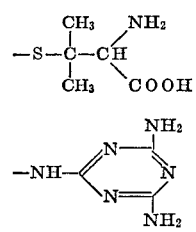

and $R_2$ is hydrogen, $-NH_2$ or $-NH \cdot CO \cdot CH_3$.

2. The method according to claim 1, wherein said compound has the formula

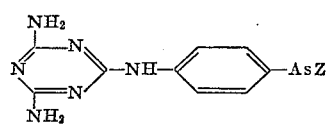

Z being defined as aforesaid.

3. The method according to claim 1 wherein said compound is admixed to a pharmaceutically acceptable carrier.

4. The method according to claim 3, wherein said compound and carrier are in the form of capsules, tablets, sprinkable powders, solutions, emulsions or suspensions for oral administration.

5. The method according to claim 3, wherein said compound is further admixed with a pharmaceutically effective amount of another filaricidal agent.

6. The method according to claim 5, wherein said other agent is diethylcarbamazine or dithazanine.

References Cited

UNITED STATES PATENTS 3,166,579  1/1965  Dunbar ............ 424—245

OTHER REFERENCES

Merck Veterinary Manual, third edition, (1967), p. 734.

SAM ROSEN, Primary Examiner